United States Patent Office 3,501,540
Patented Mar. 17, 1970

3,501,540
ISOMERIZATION OF ACYLIC TRIENES
Ernest A. Zuech, Bartlesville, Okla., assignor to Phillips Petroleum Company, a corporation of Delaware
No Drawing. Continuation-in-part of application Ser. No. 661,185, Aug. 17, 1967. This application Jan. 27, 1969, Ser. No. 794,371
Int. Cl. C07c 5/30, 13/02, 11/12
U.S. Cl. 260—666    10 Claims

ABSTRACT OF THE DISCLOSURE

Acyclic trienes undergo double bond isomerization and/or isomerization to cyclic dienes upon contact with a base-solvent catalyst system prepared by the admixture of a base selected from alkali metal hydrides, hydroxides and alkoxides with a polar aprotic solvent selected from dialkyl sulfoxides, hexaalkyl phosphoramides, cyclic sulfones, and cyclic sulfoxides.

CROSS-REFERENCES TO RELATED APPLICATIONS

This application is a continuation-in-part application of my application having Ser. No. 661,185, filed Aug. 17, 1967 now abandoned.

BACKGROUND OF THE INVENTION

This invention relates to the double bond isomerization and/or isomerization to cyclic dienes of acylic trienes. In one aspect, it relates to the cyclization of acyclic trienes having from 7 to 12 carbon atoms per molecule by contact with a base-solvent catalyst system prepared by the admixture of a selected base with a selected polar aprotic solvent. In another aspect, it relates to the formation of substituted and unsubstituted cyclic heptadienes by contacting certain acyclic trienes with an alkali metal hydride, hydroxide or alkoxide and a selected polar aprotic solvent. In another aspect, this invention relates to the double bond isomerization of acyclic trienes using metal hydroxides with polar aprotic solvent. In accordance with a further aspect, this invention relates to a process for the production of conjugated trienes and/or cyclic products from acyclic trienes using a base-solvent catalyst system whereby the period of time of reaction is regulated so as to produce the desired product.

In recent years, base-solvent systems have been found very useful in carrying out a number of catalytic conversions of hydrocarbons. For example, contacting a terminal monoolefin with a suitable base in dimethyl sulfoxide results in shifting the double bond of that internal olefin to a more central position.

However, when such base-solvent catalyst systems were applied to polyenes, the results obtained were generally not predictable. Part of the reason for this is that materials such as acyclic trienes have been known to respond erratically to different catalyst systems. For instance, a catalyst such as potassium piperidide has been found to very effectively convert 1,3,6-octatriene to the conjugated 2,4,6-octatriene, but with no effect on the 1,3,7-octatriene. Still other catalysts, such as MgO, have been found to be very active in isomerizing the 1,3,6-isomer and only partly effective with the 1,3,7-isomer.

Catalysts consisting of alkali metal hydrides, hydroxides and alkoxides in a polar aprotic solvent have been suggested for certain isomerization reactions. However, it has not heretofore been known that such a catalyst system could cause cyclization of acyclic trienes.

The conversion of acyclic polyenes has even given surprising results when contacted with base-solvent systems of the present invention. For example, catalyst systems which are formed from a base such as sodium hydride or potassium alkoxide in a solvent such as dimethyl sulfoxide have been found not to afford the conjugated isomer of these trienes but to cyclize them.

Thus, it is now surprising to find that a closely related base-solvent catalyst system, namely, the metal hydroxide-polar aprotic solvent system of the present invention, can be used to shift the double bond of the acyclic trienes with great effectiveness and with relatively little conversion to cyclic products.

Accordingly, an object of this invention is to provide an improved process for the conversion of acyclic trienes to either conjugated trienes or cyclic products.

Another object of this invention is to provide a process for the isomerization of acyclic trienes to double bond isomerization acyclic products.

A further object of this invention is to provide a process for the cyclization of acyclic trienes.

Other objects and aspects, as well as the several advantages of the invention, will be apparent to those skilled in the art upon reading the specification and the claims.

SUMMARY OF THE INVENTION

In accordance with the invention, a process is provided for the conversion of acyclic trienes to cyclic and/or double bond isomerization acyclic products which comprises contacting at least one acyclic triene with a base-solvent catalyst system formed by admixing (1) a base selected from at least one of alkali metal hydrides, hydroxides and alkoxides with (2) a solvent selected from dialkyl sulfoxides, hexaalkyl phosphoramides, cyclic sulfones and cyclic sulfoxides.

Further, according to the invention, acyclic trienes undergo cyclization upon contact with a base-solvent catalyst system prepared by the admixture of a base selected from hydrides and alkoxides of alkali metals with a polar aprotic solvent selected from dialkyl sulfoxides, hexaalkyl phosphoramides, cyclic sulfones and cyclic sulfoxides.

Further, in accordance with the invention, acyclic trienes undergo isomerization to double bond isomerization acyclic products upon contact with a base-solvent catalyst system prepared by the admixture of an alkali metal hydroxide with a polar aprotic solvent selected from dialkyl sulfoxides, hexaalkyl phosphoramides, cyclic sulfones and cyclic sulfoxides.

In accordance with one embodiment of the invention, the formation of conjugated products from acyclic trienes is favored by short reaction times with potassium hydroxide, lithium hydroxide and sodium hydroxide as the base.

In accordance with another embodiment of the invention, the conversion of acyclic trienes to cyclic products is favored by longer reaction times and by the use of alkali metal hydrides and alkoxides as the base.

DESCRIPTION OF THE PREFERRED EMBODIMENTS

The acyclic triene compounds which are suitable as starting materials for the process of the present invention are those corresponding to the following structural formulas:

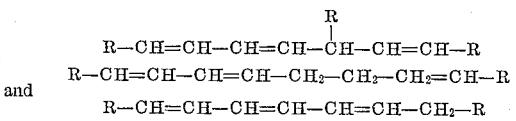

wherein each R is selected from hydrogen and straight or branched chain alkyl radicals such that the total number of carbon atoms in the acyclic triene starting material is within the range of 7 to 12 inclusive.

Exemplary triene compounds within these formulas include:

1,3,5-heptatriene
1,3,6-heptatriene
1,3,5-octatriene
1,3,6-octatriene
1,3,7-octatriene
2,4,6-octatriene
1,4,6-octatriene
1,3,5-nonatriene
3-methyl-1,4,6-heptatriene
3,6,8-dodecatriene
5-methyl-3,6,8-undecatriene
3-n-pentyl-1,4,6-heptatriene
1,3,7-dodecatriene
1,3,5-decatriene
4,6,8-dodecatriene
1,3,7-undecatriene
5-ethyl-1,3,6-octatriene
1,4,9-decatriene
1,5,9-decatriene, and the like, and mixtures thereof.

The invention is most advantageously applied to trienes which have terminal, or non-conjugated, or non-centrally located double bonds.

The base component of the catalyst system is selected from the hydroxides, hydrites, and alkoxides of lithium, sodium, potassium, rubidium, and cesium. The alkyl portion of the alkoxides contains from 1 to about 10, preferably from 1 to about 5, carbon atoms. Some specific examples of suitable bases are sodium hydroxide, lithium hydride, rubidium hydride, cesium hydride, potassium hydroxide, sodium methoxide, potassium ethoxide, potassium t-butoxide, and the like, and mixtures thereof.

In the production of double bond isomerization acyclic products from acyclic trienes, the preferred base component of the catalyst system is selected from the hydroxides of potassium, sodium and lithium. Of these, potassium hydroxide is presently most preferred.

In the production of cyclic products from acyclic trienes, the alkali metal hydrides and alkoxides are the preferred bases.

The solvent component of the base-solvent catalytic system is a solvent selected from: dialkyl sulfoxides wherein the alkyl portion contains from 1 to 5 carbon atoms; hexaalkyl phosphoramides wherein the alkyl groups contain from 1 to 3 carbon atoms; tetrahydrothiophene-1,1-dioxide; 3-methyltetrahydrothiophene-1,1-dioxide; tetrahydrothiophene - 1-oxide; and 3-methyltetrahydrothiophene-1-oxide. Some specific examples of the dialkyl sulfoxides and hexaalkyl phosphoramides are dimethyl sulfoxide, diethyl sulfoxide, dipropyl sulfoxide, dipentyl sulfoxide, hexamethyl phosphoramide, hexaethyl phosphoramide, hexapropyl phosphoramide, and the like, and mixtures thereof.

The proportion of the base component to the solvent component of the base-solvent catalyst system can vary over a broad range. Generally sufficient solvent will be present such that a substantial quantity of the base will be dissolved under the conditions of the conversion. From about 10 to about 100 parts of solvent will be used for each part of base, by weight. The catalyst system is prepared simply by mixing the base with the solvent. In some instances it is desirable to heat the base-solvent mixture, at temperatures up to its boiling point, to facilitate dissolution of the base. When the base is a metal hydroxide, there will be relatively little dissolution of the metal hydroxide and that catalyst system will appear heterogeneous.

The reactions of the invention are generally carried out at a temperature within the range of from about 0 to about 400° C. for a period of time varying from about 0.1 to about 75 hours.

In carrying out either the cyclization reaction or isomerization reaction, it is presently preferred to employ reaction temperatures of 50-150° C. for convenience. In the production of conjugated acyclic products from acyclic trienes, the period of contacting is generally in the range of 1 minute to 24 hours, preferably 5 minutes to 2 hours, depending upon the desired degree of conversion and the quantity of cyclics which can be permitted in the final product.

The reaction can be carried out at any convenient pressure which will maintain a liquid phase, ambient pressure being convenient. The contact of acyclic triene and base-solvent catalyst system can be accomplished using any conventional contacting apparatus, and the reaction can be carried out either batchwise or continuously. The base-solvent catalyst system usage will generally be such that from about 0.001 to about 1 mole of alkali metal compound will be present for each mole of the acyclic triene. However, concentrations outside this range can also be used if desired.

As indicated above, the contacts of acyclic triene and base-solvent catalyst system can be accomplished using any conventional contacting apparatus, and the reaction can be carried out either batchwise or continuously. Because the metal hydroxides are largely insoluble in the present system, flow systems in which the feed material and solvent are passed through a fixed bed of the metal hydroxide can be used conveniently.

In the embodiment of the invention for production of double bond isomerization acyclic products from acyclic trienes, the process of the present invention produces acyclic triene products in which the position of the double bonds are altered such as by being conjugated and/or more centrally located within the molecule. Typical conversions according to this embodiment of the invention include: The isomerization of 1,3,6-heptatriene to 1,3,5-heptatriene; the isomerization of 1,3,5-, 1,3,6-, 1,3,7-, or 1,4,6-octatriene to 2,4,6-octatriene; the isomerization of 1,3,5-nonatriene to 2,4,6-nonatriene; the isomerization of 5-methyl-1,3,6-octatriene to 5-methyl-2,4,6-octatriene; the isomerization of 1,4,9- or 1,5,9-decatriene to 3,5,7-decatriene, or 2,4,6-decatriene; the isomerization of 3-n-pentyl-1,4,6-heptatriene to 3-n-pentyl-2,4,6--heptatriene, and the like.

These products have utility for polymerization into homopolymers and into copolymers when used in combination with other saturated organic compounds. Such polymerized materials can be formed into useful materials such as, for example, sheets, films, and the like. Moreover, the triene products of the invention can also be used as chemical intermediates with advantage. For example, the trienes can be converted into polyepoxide compounds which can be utilized in polymeric compositions such as adhesive formulations.

The cyclization embodiment of the process of the present invention generally produces, depending upon the starting materials, substituted or unsubstituted cyclic heptadienes. Such products have utility for the production of homopolymers and copolymers with other unsaturated organic compounds. These polymeric materials can be formed into useful products such as, for example, sheets, films, and the like. For example, Belgian Patent 661,088 describes a process in which cycloheptadienes are added to an aqueous emulsion process for the polymerization of 1,3-butadiene or 1,3-isoprene. The resulting rubbery products have greatly reduced gel content.

Some examples of products obtainable from this embodiment of the present invention are 1-methyl-1,3-cycloheptadiene, 2-methyl-1,3-cycloheptadiene as well as other methyl-, ethyl-, propyl-, butyl-, and pentlyl-substituted cycloheptadienes depending upon the number of carbon atoms and skeletal arrangement of the starting triene. Several isomers of such cyclic products of a given carbon number can be present. In addition, some cyclic products having 8 or more ring carbon atoms can also sometimes be present.

The process of the present invention is not limited to the conversion of individual triene compounds. Mixtures of trienes can be converted and, in some instances, the mixtures are thus simplified. The conversion of mixtures of octatrienes according to the present invention is particularly valuable.

EXAMPLE I

Conversion of octatrienes using KO-t-Bu/DMSO

A mixture of 40 ml. of dimethyl sulfoxide and 2.24 g. (0.02 mole) of potassium t-butoxide was charged into a reaction vessel and 15.1 g. of mixed octatrienes was added, dropwise, over a period of about 40 minutes. The mixed octatrienes consisted of about 60 mole percent 1,3,6-octatriene and about 40 mole percent 1,3,7-octatriene.

The reaction mixture was stirred at room temperature for about 2.5 hours and then heated at about 100° C. for about ½ hour. The reaction mixture was then hydrolyzed by addition of water, the organic phase then being separated, and distilled. The yield of methylcycloheptadienes was found to be about 5.1 g. (34% yield). The methylcycloheptadienes consisted of a mixture of isomers, 80 to 90% of which were found to be a mixture of 1-methyl-1,3-cycloheptadiene and 2-methyl-1,3-cycloheptadiene.

EXAMPLE II

Conversion of octatrienes using NaH/DMSO

A mixture of 40 ml. of dimethylsulfoxide and 1 g. of 50 weight percent sodium hydride in mineral oil was heated at 70–80° C. for 1 hour, cooled, and then maintained under nitrogen until used.

A 15.5 g. quantity of an octatriene mixture similar to that used in Example I was then added to the above-prepared catalytic solution and the mixture was heated at about 70° C. for about 7 hours. At the end of this reaction period, the reaction mixture was hydrolyzed by the addition of water and the organic layer was separated and analyzed by gas-liquid chromatography. The analysis showed the presence of 1.8 g. (12% yield) of methylcycloheptadiene. The methylcycloheptadiene product was similar to that obtained in Example I.

EXAMPLE III

Conversion of octatrienes using KOH/DMSO

A 5.0 g. quantity of potassium hydroxide pellets and 30 ml. of dimethyl sulfoxide were sealed into a pressure vessel equipped with a septum through which liquids could be injected. The vessel was immersed in an oil bath maintained at 80° C. The contents of the vessel were stirred. When temperature equilibrium was established, 2.28 g. of mixed octatrienes (prepared by the dimerization of butadiene in the presence of a zero-valent nickel complex and a hydroxylic solvent and consisting of about a 1:3 mixture of 1,3,6-octatriene and 1,3,7-octatriene contaminated with about 6% 4-vinylcyclohexene and 1–2% of other unidentified materials) were added via a syringe and stirring was continued. After 2 hours at 80° C. the vessel was removed from the bath and allowed to cool for 30 minutes. The reaction mixture was then poured into 150 ml. of ice water and the aqueous layer was extracted three times with 20 ml. portions of pentene. The combined extracts were washed twice with 10 ml. portions of water and were stored overnight at −5° C. over anhydrous MgSO$_4$.

The dried crude product was then distilled to give 1.91 g. (84% of theory) of material boiling at about 66° C. (at 44 mm.). Gas-liquid chromatographic analysis of the distillate showed that the material was 95% pure, 2,4,6-octatriene with slight amounts of methylcycloheptadiene and starting materials.

This run illustrates that the present invention process is very effective in the conversion of both 1,3,6- and 1,3,7-octatrienes to the 2,4,6-octatriene with very little conversion to the cyclic compound. Thus, the material, 2,4,6-octatriene is now easily available in a two-step sequence from butadiene. An overall yield of about 70% may be obtained using a dimerization step employing a conventional nickel catalyst followed by isomerization using the process of the present invention. Each of the isomers produced from the dimerization step are thus converted to the 2,4,6-octatriene.

EXAMPLE IV

Conversion of octatrienes using KOH/DMSO

Another run was carried out in which the mixed octatrienes were isomerized using the process of the present invention and the procedure was essentially identical to that described in Example III above. In this run samples were removed from the reaction mixture periodically to learn the effect of reaction time upon the products. The results of this series are shown in the table below. In this run 1 ml. of the octatriene mixture was contacted at about 90° C. with 5 g. of KOH in 20 ml. of dimethyl sulfoxide.

TABLE I

| Time | Starting Octatrienes, percent | 2,4,6-octatrienes, percent | Methylcycloheptadienes, percent |
|---|---|---|---|
| 15 minutes | 33 | 66 | 1 |
| 1 hour | 6 | 92 | 2 |
| 2 hours | 3 | 90 | 7 |
| 4 days | | 1 | 99 |

The data in the table above illustrate very clearly that the invention process is extremely effective in isomerizing the octatrienes with excellent selectivity, but extended reaction times will result in a secondary conversion in which the 2,4,6-octatrienes are apparently converted to methylcycloheptadienes.

EXAMPLE V

Conversion of octatrienes using NaOH/DMSO

Still another run was carried out in which mixed octatrienes were isomerized and samples were periodically withdrawn. This run was also carried out in a manner largely identical to that of Example III except that the metal hydroxide was NaOH. In this run, 1 ml. of the octatriene mixture was contacted at about 90° C. with 5.0 g. of NaOH in 20 ml. of dimethyl sulfoxide. The results of this series are shown in the table below.

TABLE II

| Time | Starting Octatrienes, percent | 2,4,6-octatrienes, percent | Methylcycloheptadienes, percent |
|---|---|---|---|
| 20 minutes | 44 | 55 | 1 |
| 1 hour | 19 | 79 | 2 |
| 17 hours | 6 | 85 | 9 |
| 35 hours | 2 | 81 | 17 |
| 6 days | 2 | 68 | 30 |

The data in the table above illustrate that the sodium hydroxide is also effective in isomerizing the octatriene mixture to 2,4,6-octatriene although not as rapidly as the potassium hydroxide. The reaction time effect is also seen in that prolonged reaction times will generate the cyclic by-product at the expense of the conjugated linear product.

EXAMPLE VI

Conversion of 1,5,9-decatriene using KOH/DMSO

Using the same apparatus and general procedure described in Examples III, IV, and V, 5.0 g. of KOH, 50 ml. of dimethyl sulfoxide (DMSO) and 2.7 g. of 1,5,9-decatriene were charged into the dry, nitrogen purged reaction vessel. The reaction was allowed to proceed for about 70 hours, with stirring, at 90° C. The reaction mixture was then poured into water, the mixture was extracted with pentane, and the extract was washed, dried, and evaporated yielding 1.5 g. of recovered products boiling at about 83° C. (27 mm.).

A sample of the recovered mixture was then conventionally hydrogenated using a platinum oxide catalyst and glacial acetic acid. The sample absorbed 2.4 equivalents of hydrogen and the mass spectral examination, and gas-liquid-chromatographic examination further supported that about 22.5 mole percent of the product was acyclic $C_{10}$ products and about 72 mole percent of the product consisted of two cyclic $C_{10}$ isomers. Thus, the KOH/DMSO system under the conditions of this example produced both cyclic and double bond isomerization acyclic products.

EXAMPLE VII

Conversion of 1,5,9-decatriene using KO-t-Bu/DMSO

In a manner essentially identical to that of the preceding example, 0.20 g. potassium t-butoxide (KO-t-Bu), 10 ml. DMSO, and 0.20 g. 1,5,9-decatriene were reacted at 90° C. Periodic samples were taken at intervals up to 3 days showed the same distribution of both cyclic and double bond isomerization acyclic products as that obtained by the KOH/DMSO system of the preceding example.

EXAMPLE VIII

Conversion of 5-methyl-1,3,6-heptatriene using KO-t-Bu/HMPA

Similarly to the above examples, 0.56 g. of potassium t-butoxide, 10 ml. hexamethylphosphoramide (HMPA) and 1.1 g. 5-methyl-1,3,6-heptatriene were stirred for 30 minutes at 80° C. at which time GLC analysis of the reaction mixture showed the presence of 79 mole percent methylcycloheptadienes.

EXAMPLE IX

Conversion of 5-methyl-1,3,6-heptatriene using KO-t-Bu/sulfolane

As in the above examples, 0.56 g. potassium t-butoxide, 20 ml. sulfolane, and 1.1 g. 5-methyl-1,3,6-heptatriene were stirred at 90° C. After 3 minutes reaction time, GLC analysis showed the triene to be essentially completely converted into the conjugated methylheptatriene isomers, including cis and trans isomers.

EXAMPLE X

Conversion of 1,5,9-decatriene using KOH/sulfolane

As in the above examples, 2.7 g. 1,5,9-decatriene, 5.0 g. KOH, and 50 ml. sulfolane were stirred at 90° C. for about 70 hours. GLC analysis of the reaction mixture both before and after hydrogenation (3.0 equivalents of hydrogen absorbed) showed that the feed triene was converted to conjugated products with a conversion of about 13 percent. No cyclic products were observed.

EXAMPLE XI

Conversion of 5-methyl-1,3,6-heptatriene using KOH/sulfolane

As in the above examples, 1.0 g. KOH, 20 ml. sulfolane, and 0.65 g. 5-methyl-1,3,6-heptatriene were stirred at 90° C. After 15 minutes GLC analysis of a sample showed that essentially 100 percent of the product had been converted into conjugated products. After 22 hours, less than 1 percent of cyclization was observed.

I claim:
1. A process for the conversion of acyclic trienes having from 7–12, inclusive, carbon atoms per molecule to cyclic and double bond isomerization acyclic products which comprises contacting said triene with a base-solvent catalyst system formed by admixing (1) a base selected from at least one of alkali metal hydrides, hydroxides and alkoxides wherein the alkyl portion of the alkoxide contains from 1 to 10, inclusive, carbon atoms, with (2) a solvent selected from dialkyl sulfoxide, hexaalkyl phosphoramide, cyclic sulfoxide and cyclic sulfone, the length of time for said contacting being controlled so as to produce cyclic and/or isomerization acyclic products.

2. A process according to claim 1 wherein said acyclic triene has the formula:

$$R-CH=CH-CH=CH-\underset{R}{\overset{R}{C}H}-CH=CH-R$$
$$R-CH=CH-CH=CH-CH_2-CH_2-CH=CH-R$$
and
$$R-CH=CH-CH=CH-CH=CH-CH_2-R$$

wherein each R is selected from hydrogen and straight or branched chain alkyl radicals such that the total number of carbon atoms in the acyclic triene starting material is within the range of 7 to 12, inclusive.

3. A process according to claim 1 for primarily producing double bond isomerization acylic products wherein said base is an alkali metal hydroxide and said contacting is effected for a period of time of about 1 minute to 24 hours.

4. A process according to claim 1 for primarily producing cyclic products wherein said base is an alkali metal hydride or alkoxide and said contacting is effected for a period of time of about 0.1–75 hours.

5. A process according to claim 1 wherein said solvent is selected from: dialkyl sulfoxides wherein the alkyl portion contains from 1 to 5 carbon atoms; hexaalkyl phosphoramides wherein the alkyl groups contain from 1 to 3 carbon atoms; tetrahydrothiophene-1,1-dioxide; 3-methyl-tetrahydrothiophene-1,1-dioxide; tetrahydrothiophene-1-oxide; and 3-methyl-tetrahydrothiophene-1-oxide.

6. A process for cyclization of trienes according to claim 1 comprising contacting octatriene and substituted octatrienes with a base-solvent catalyst system prepared by admixing (1) a base selected from alkali metal hydrides and alkoxides wherein the alkyl portion of the alkoxide contains from 1 to 10, inclusive, carbon atoms, with (2) a solvent selected from dialkyl sulfoxides wherein the alkyl portion contains from 1–5 carbon atoms, alkyl phosphoramides wherein the alkyl groups contains 1–3 carbon atoms, and sulfolane.

7. A process according to claim 6 wherein said base is present in an amount of from about 0.001 to about 1 mole of base per mole of octatriene and substituted octatriene, and wherein said contacting is effected at a temperature within the range 0–400° C.

8. A process according to claim 3 wherein said acyclic triene is selected from a mixture of octatrienes, decatriene, and 5-methyl-1,3,6-heptatriene, said base is selected from potassium hydroxide and sodium hydroxide, and said solvent is selected from dimethyl sulfoxide and sulfolane.

9. A process according to claim 4 wherein said acyclic trienes are selected from a mixture of octatrienes, decatriene and 5-methyl-1,3,6-heptatriene, said base is selected from sodium hydride and potassium t-butoxide and said solvent is selected from hexamethyl phosphoramide, sulfolane and dimethyl sulfoxide.

10. A process according to claim 1 wherein the acyclic trienes comprise a mixture of octatrienes.

References Cited

UNITED STATES PATENTS 3,309,410 3/1967 Schriesheim.
3,347,944 10/1967 Fritz.
3,213,155 10/1965 Schriesheim _____ 260—680
3,217,050 11/1965 Schriesheim _____ 260—680

DELBERT E. GANTZ, Primary Examiner

V. O'KEEFE, Assistant Examiner

U.S. Cl. X.R.

260—677